United States Patent
Feng et al.

(10) Patent No.: US 10,592,729 B2
(45) Date of Patent: Mar. 17, 2020

(54) FACE DETECTION METHOD AND APPARATUS

(71) Applicant: Samsung Electronics Co., Ltd., Suwon-si, Gyeonggi-do (KR)

(72) Inventors: Hao Feng, Beijing (CN); Chao Zhang, Beijing (CN); Wonjun Hwang, Seoul (KR); Biao Wang, Beijing (CN); Bing Yu, Beijing (CN); Chang Kyu Choi, Seongnam-si (KR); Jaejoon Han, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 482 days.

(21) Appl. No.: 15/393,787

(22) Filed: Dec. 29, 2016

(65) Prior Publication Data

US 2017/0213071 A1    Jul. 27, 2017

(30) Foreign Application Priority Data

Jan. 21, 2016 (CN) .......................... 2016 1 0040719
Sep. 30, 2016 (KR) ........................ 10-2016-0126850

(51) Int. Cl.
| | | |
|---|---|---|
| *G06K 9/00* | (2006.01) | |
| *G06K 9/68* | (2006.01) | |
| *G06K 9/46* | (2006.01) | |
| *G06T 7/73* | (2017.01) | |
| *G06K 9/62* | (2006.01) | |

(52) U.S. Cl.
CPC ....... *G06K 9/00228* (2013.01); *G06K 9/4652* (2013.01); *G06K 9/6257* (2013.01); *G06K 9/6857* (2013.01); *G06T 7/74* (2017.01); *G06T 2207/20016* (2013.01); *G06T 2207/30201* (2013.01)

(58) Field of Classification Search
CPC ............ G06T 7/74; G06T 2207/20016; G06T 2207/30201; G06K 9/00–82
See application file for complete search history.

(56) References Cited

U.S. PATENT DOCUMENTS

| | | | |
|---|---|---|---|
| 7,315,631 B1 | 1/2008 | Corcoran et al. | |
| 8,254,643 B2 | 8/2012 | Shi et al. | |
| 8,433,106 B2 | 4/2013 | Jessen et al. | |
| 8,649,604 B2* | 2/2014 | Steinberg | G06K 9/00228 382/118 |
| 8,902,323 B2 | 12/2014 | Zhang | |
| 2003/0108244 A1* | 6/2003 | Li | G06K 9/00228 382/227 |

(Continued)

FOREIGN PATENT DOCUMENTS

| | | |
|---|---|---|
| JP | 2004-242068 A | 8/2004 |
| JP | 2006-202184 A | 8/2006 |

(Continued)

*Primary Examiner* — Sean T Motsinger
(74) *Attorney, Agent, or Firm* — Harness, Dickey & Pierce, P.L.C.

(57) ABSTRACT

Disclosed is a face detection method and apparatus, the method including detecting a candidate area from a target image using a first sliding window moving at an interval of a first step length and detecting a face area in the candidate area using a second sliding window moving at an interval of a second step length less than the first step length.

18 Claims, 15 Drawing Sheets

(56) References Cited

U.S. PATENT DOCUMENTS

| | | | | |
|---|---|---|---|---|
| 2006/0126918 A1* | 6/2006 | Oohashi | ............... | G05D 1/0251 382/153 |
| 2007/0019863 A1* | 1/2007 | Ito | ...................... | G06K 9/00248 382/190 |
| 2007/0172126 A1* | 7/2007 | Kitamura | ........... | G06K 9/00228 382/190 |
| 2008/0037838 A1* | 2/2008 | Ianculescu | ......... | G06K 9/00228 382/118 |
| 2011/0194779 A1* | 8/2011 | Zhong | ................ | G06K 9/00288 382/218 |
| 2011/0255781 A1* | 10/2011 | Hamsici | ............... | G06K 9/4671 382/170 |
| 2015/0269733 A1* | 9/2015 | Kosaki | .................... | G06K 9/74 382/107 |
| 2018/0018503 A1* | 1/2018 | Wang | ....................... | G06K 9/00 |
| 2018/0018535 A1* | 1/2018 | Li | ........................ | G06K 9/4628 |
| 2018/0150681 A1* | 5/2018 | Wang | ....................... | G06T 7/11 |
| 2019/0026538 A1* | 1/2019 | Wang | ................. | G06K 9/00261 |

FOREIGN PATENT DOCUMENTS

| | | |
|---|---|---|
| JP | 2008-211534 A | 9/2008 |
| JP | 4429241 B2 | 3/2010 |
| JP | 2011-053915 A | 3/2011 |
| JP | 5141317 B2 | 2/2013 |
| JP | 2014-142832 A | 8/2014 |
| KR | 10-1449744 B1 | 10/2014 |

\* cited by examiner

Image pyramid

FIG. 7
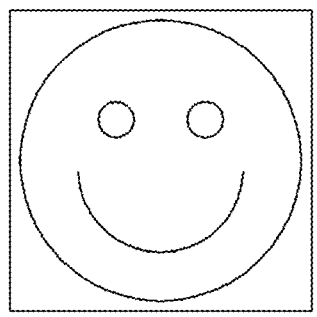
Template image of
standard face detector
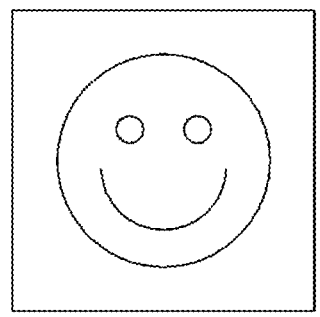
Template image of
small face detector

FIG. 9

| $g_0$ | $g_1$ | $g_2$ |
|---|---|---|
| $g_3$ | $g_c$ | $g_4$ |
| $g_5$ | $g_6$ | $g_7$ |

FACE DETECTION METHOD AND APPARATUS

CROSS-REFERENCE TO RELATED APPLICATION

This application claims under 35 U.S.C. § 119 to Chinese Patent Application No. 201610040719.7 filed on Jan. 21, 2016, in the State Intellectual Property Office of the People's Republic of China and Korean Patent Application No. 10-2016-0126850 filed on Sep. 30, 2016 in the Korean Intellectual Property Office, the entire contents of which are incorporated herein by reference in their entirety.

BACKGROUND

1. Field

At least one example embodiment relates to image processing technology and, more particularly, to a face detection method and apparatus.

2. Description of the Related Art

An image may be captured under various conditions and situations. In the captured image, a face may be represented in different sizes and postures. To detect a face from such image, faces represented in a plurality of postures and a plurality of sizes may need to be detected.

As a method of detecting a face from an image, a sliding window-scheme and an image pyramid-based scheme may be employed. The sliding window-based scheme may be used to scan an image. In the sliding window-based scheme, a number of scanning times may be associated with a performance such as a detection speed. An image pyramid may include a plurality of different sized images. In the image pyramid-based scheme, a number of images used for detecting a face may be associated with the performance including the detection speed.

SUMMARY

Some example embodiments relate to a method of detecting a face.

According to at least some example embodiments, a method of detecting a face includes acquiring a target image to detect a face; scanning the target image using a first sliding window moving at an interval of a first step length; detecting a candidate area of the face in the target image based on first scan images scanned using the first sliding window; scanning the candidate area using a second sliding window moving at an interval of a second step length that is less than the first step length; and detecting a face area in the candidate area based on second scan images scanned using the second sliding window.

The detecting of the candidate area may include extracting a first feature from a first image, the first image being one of the first scan images; inputting the first feature to weak classifiers, each configured to identify the first image; generating a first cumulative score by accumulating scores acquired from the weak classifiers; verifying whether the first scan image corresponds to the face or a background based on whether the first cumulative score is included in a first range; and detecting the candidate area based on a verification result.

The detecting of the face area may include extracting a second feature from a second image, the second image being one of the second scan images; inputting the second feature to weak classifiers, each configured to identify the second image; generating a second cumulative score by accumulating scores acquired from the weak classifiers; verifying whether the second scan image corresponds to the face or the background based on whether the second cumulative score is included in a second range; and detecting the face area based on a verification result, the first range greater than the second range.

The first feature may be a multi-scale block local binary pattern (MB-LBP) feature, and the weak classifiers may each be configured to, generate a score based on the MB-LBP feature; verify whether the first image corresponds to the face based on the generated score; and input the MB-LBP feature to a subsequent weak classifier when the first image is the face.

The first range may be generated based on a first threshold and a second threshold, and the weak classifiers may each configured to determine that the first image corresponds to the face when a score greater than or equal to the first threshold is generated; and determine that the first image corresponds to the background when a score less than the second threshold is generated.

The method may further include detecting the face area from the target image a value of each pixel of which is expressed as a value of a second type in response to a failure to detect the face area from the target image the value of each pixel of which is expressed as a value of a first type.

At least one of the first type or the second type may include at least one of a luma or red.

According to at least some example embodiments, a method of detecting a face includes acquiring a target image to detect a face; generating an image pyramid including first images of a first scale interval and second images of a second scale interval based on the target image; detecting a first face area based on the first images; detecting a second face area based on the second images; and detecting a third face area in the target image based on the first face area and the second face area.

The detecting of the first face area may include detecting the first face area using a small face detector configured to detect a face of a first size from an image of a second size, and the detecting of the second face area may include detecting the second face area using a standard face detector configured to detect a face of a third size from an image of a fourth size.

A ratio of the first size to the second size may be less than a ratio of the third size to the fourth size.

The method may further include determining the first scale interval based on a size of a target face to be detected, a size of a first image, and a size of the target image; and determining the second scale interval based on the size of the target face, a size of a second image, and the size of the target image.

The detecting of the first face area may further include scanning at least one of the first images using a first sliding window moving at an interval of a first step length to generate first scan images; detecting a candidate area of the face in the scanned at least one first image based on the first scan images; scanning the candidate area using a second sliding window moving at an interval of a second step length less than the first step length to generate second scan images; detecting a face area of the candidate area based on the second scan images; and detecting the first face area based on the detected face area of the candidate area.

The detecting of the third face area may include calculating a size and a location of the face in the target image based on a scale of an image from which the first face area is detected, coordinates of the first face area, a scale of an image from which the second face area is detected, and coordinates of the second face area.

The method may further include determining whether the detected third face area includes two face areas; and when the third face area is determined to include two face areas, determining whether the two face areas overlap each other based on a ratio between an overlapping area between the two face areas and an area corresponding to a combination of the two face areas; and removing one of the two face areas in the overlapping area.

The method may further include detecting the third face area from the target image a value of each pixel of which is expressed as a value of a second type in response to a failure to detect the face area from the target image the value of each pixel of which is expressed as a value of a first type, wherein at least one of the first type or the second type includes at least one of a luma or red.

A non-transitory computer-readable medium may include computer readable instructions to cause a computer to perform the method.

According to at least some example embodiments, an apparatus for detecting a face includes memory storing computer-executable instructions; one or more processors configured to execute the computer-executable instructions such that the one or more processors are configured to, acquire a target image to detect a face and generate an image pyramid including first images of a first scale interval and second images of a second scale interval based on the target image, detect a first face area based on the first images, detect a second face area based on the second images, and detect a third face area in the target image based on the first face area and the second face area.

The one or more processors may be configured to execute the computer-executable instructions such that the one or more processors are configured to detect a face of a first size from an image of a second size, and detect a face of a third size from an image of a fourth size, such that a ratio of the first size face to the second size is less than a ratio of the third size to the fourth size.

The one or more processors may be configured to execute the computer-executable instructions such that the one or more processors are configured to scan at least one of the first images using a first sliding window moving at an interval of a first step length to generate first scan images, detect a candidate area of a face in the first image based on the first scan images scanned using the first sliding window, scan the candidate area using a second sliding window moving at an interval of a second step length less than the first step length to generate second scan images, and detect a face area of the candidate area based on the second scan images scanned using the second sliding window.

The one or more processors may be configured to execute the computer-executable instructions such that the one or more processors are configured to implement a strong classifier that includes weak classifiers such that the strong classifier is configured to extract a first feature from at least one of the first scan images, input the first feature into the weak classifiers, generate a first cumulative score by accumulating scores acquired from the weak classifiers, verify whether the at least one first scan image corresponds to the face or a background based on whether the first cumulative score is included in a first range, and detect the candidate area based on a verification result.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 7 illustrates an example of a template image according to at least one example embodiment;

FIG. 9 illustrates an example of a multi-scale local binary pattern (MB-LBP) feature according to at least one example embodiment;

DETAILED DESCRIPTION

Figure 1:
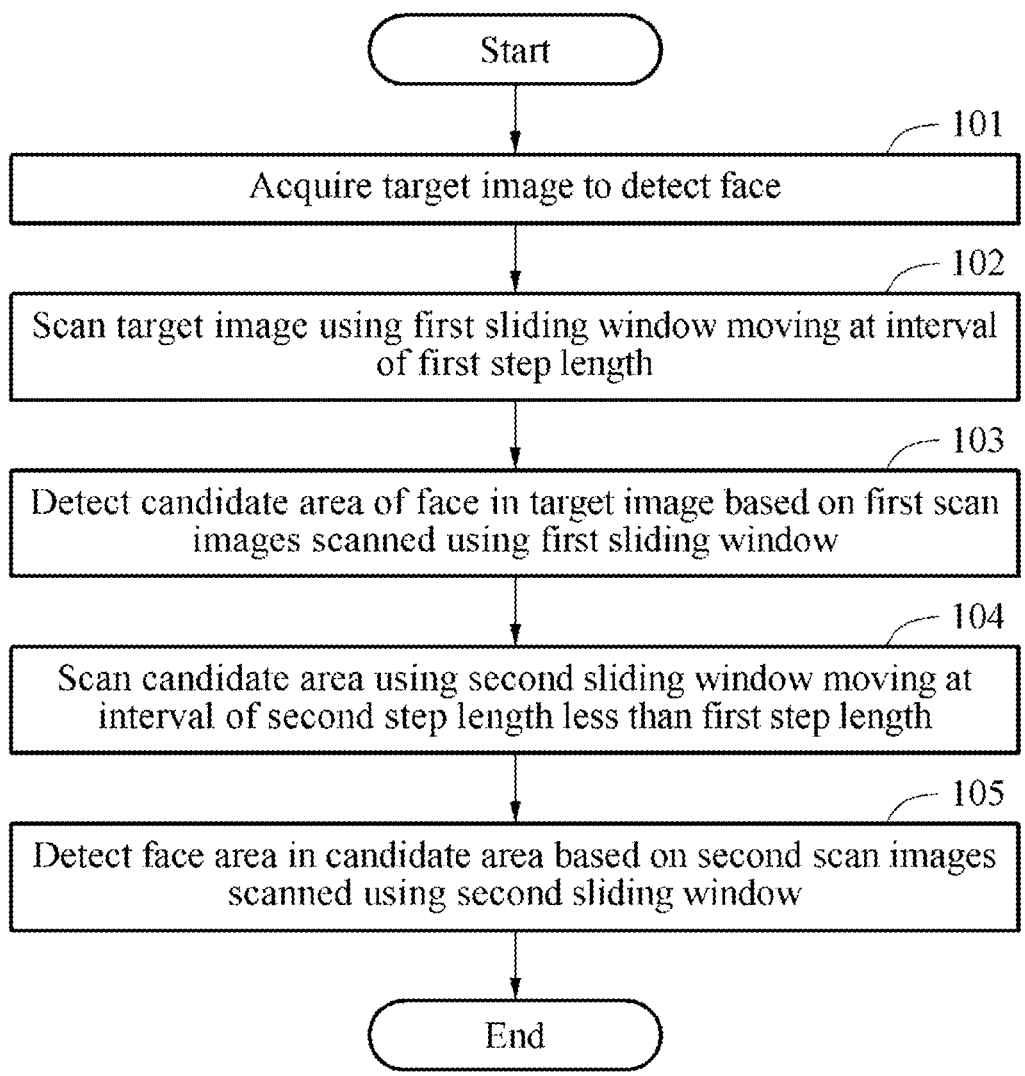
FIG. 1 illustrates an example of a face detection method according to at least one example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Example of Coarse-to-fine Detection Scheme

FIG. 1 illustrates an example of a face detection method according to at least one example embodiment.

In operation 101, a face detection apparatus may acquire a target image to detect a face. The face detection apparatus may be an apparatus for detecting a face from an image and implemented as, for example, software modules, hardware modules, or various combinations thereof. A target image may be an image used for detecting the face and also be an image corresponding to a target of face detection performed by the face detection apparatus.

Figure 2:
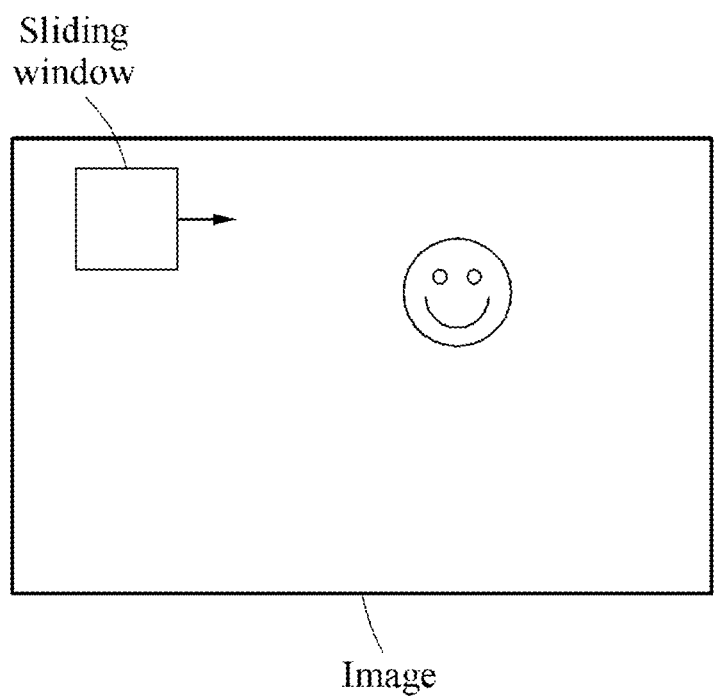
FIG. 2 illustrates an example of a sliding window-based detection scheme according to at least one example embodiment.

An adaptive boosting (AdaBoost) algorithm may be used as a method of detecting the face. Based on the AdaBoost algorithm, a detector may select features having relatively high accuracy on the face detection from a plurality of features and weak classifiers having relatively high accuracy on the face detection from a plurality of weak classifiers. Also, the detector may be trained based on a scheme of determining an optimal or, alternatively, desirable threshold for the face detection. A strong classifier may be trained based on the selected features and the selected classifiers, and the detector may be implemented using the strong classifier. A sliding window may be used to detect the face. Referring to FIG. 2, the sliding window may scan an image. The detector may verify whether the image scanned by the sliding window is the face or the background. For example, when a feature extracted from the image scanned by the sliding window satisfies a condition of a threshold defined in advance, the detector may verify that the scanned image to be the face.

To detect faces in various types of postures, a plurality of detectors corresponding to different postures of faces may perform verification on the scanned image. When the plurality of detectors is used, a detection rate higher than that of when a single detector is used may be achieved. According to an increase in the number of scanned images, a detection speed may decrease.

The sliding window may scan images while moving at intervals of a desired or, alternatively, predetermined step length. The detector may detect the face based on the images scanned by the sliding windows. Here, the step length of the sliding window may be associated with an accuracy on the face detection. When the step length is relatively large, the sliding window may not scan the entire face and thus, the accuracy on the face detection may be relatively low. When the step length is relatively small, the accuracy on the face detection may be relatively high and the number of scan images input to the detector may be correspondingly large. To accurately estimate a position and a size of the face, a relatively small step length may be selected from step lengths of the sliding window. In this example, due to the small step length, the detector processing a high density scan image may be restricted on a performance associated with the detection speed. Also, when detectors corresponding to various postures and detectors corresponding to various sizes are adopted, the number of scanning times and the number of scanned images of the sliding window for detecting the face may affect the detection speed. Thus, a setting of the step length may affect the performance associated with the detection speed.

In operation 102, the face detection apparatus may scan a target image using a first sliding window moving at an interval of a first step length. The face detection apparatus may adopt two different types of step lengths and detect the face from the target image.

In operation 103, the face detection apparatus may detect a candidate area of the face in the target image based on first scan images scanned using the first sliding window. The face detection apparatus may verify whether the first scan images each correspond to the face or a background and detect the candidate area. In this example, a process of detecting the candidate area may also be referred to as a coarse detecting. Also, a process of scanning the target image using the first sliding window corresponding to the first step length may also be referred to as a coarse scanning. As further discussed below, a candidate area detected in the coarse detecting may include the face and also include a background surrounding the face.

In operation 104, the face detection apparatus may scan a candidate area using a second sliding window moving at an interval of a second step length less than the first step length. In this example, the second sliding window may be the same in size as the first sliding window. However, the size of the second sliding window is not limited to the example and various sizes of sliding windows are applicable to the first sliding window and the second sliding window.

In operation 105, the face detection apparatus may detect a face area in the candidate area based on second scan images scanned using the second sliding window. Here, a process of detecting the face area from the detected candidate area may also be referred to as a fine detecting. Also, a process of scanning the candidate area using the second sliding window corresponding to the second step length less than the first step length may also be referred to as a fine scanning.

Since the second step length is less than the first step length, the second sliding window may move at an interval shorter than that of the first sliding window. Also, the second sliding window may scan the candidate area only and thus, the number of second scan images may be less than the number of first scan images. The face detection apparatus may verify whether each of the second scan images corresponds to the face or the background and detect the face area in the candidate area.

The face detection apparatus may be designed such that a detection accuracy obtained by identifying the first scan images is higher than a detection accuracy obtained by identifying the second scan images. For example, a condition used as a reference when verifying whether the first scan image corresponds to the face or the background may be more strict than a condition used as a reference when verifying whether the second scan image corresponds to the face or the background. The face detection apparatus may use the second scan images to detect the background from the candidate area and detect the face area. For example, the face detection apparatus may detect the candidate area including the face and the background surrounding the background from the target image through the coarse scanning, and detect the face area obtained by removing the background from the candidate area through the fine scanning. Since the face detection apparatus performs scanning at the second step length adopted in the fine scanning, the detection accuracy may be improved. Also, since the face detection apparatus performs the fine scanning on the candidate area, the number of scanning times may be reduced and the performance of the detection speed may be improved.

Figure 3:
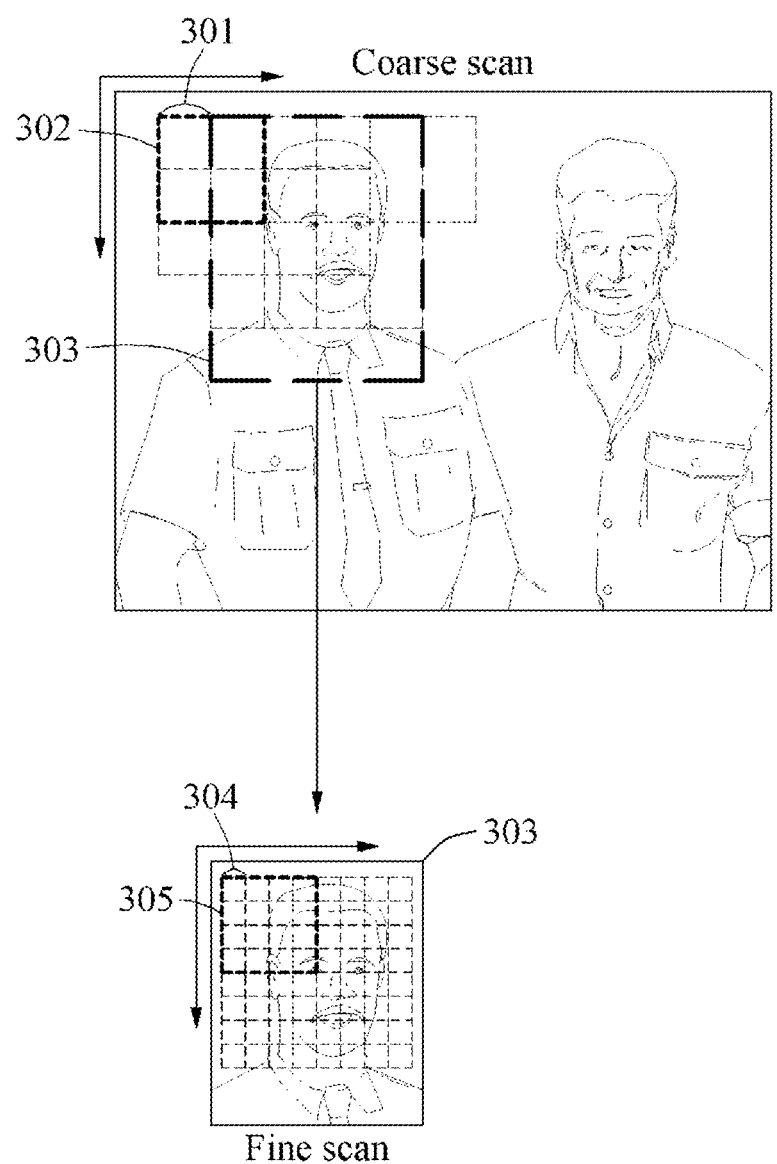
FIG. 3 illustrates an example of coarse scanning and fine scanning according to at least one example embodiment.

FIG. 3 illustrates an example of coarse scanning and fine scanning according to at least one example embodiment.

Referring to FIG. 3, a face detection apparatus may detect a candidate area 303 from a target image through a coarse scanning. The detection apparatus may perform the coarse scanning on the target image while moving a first sliding window 302 at an interval of a first step length 301. As further discussed above, the first step length may be greater than a second step length 304 adopted in a fine scanning. For example, the first step length 301 may be set to be 4 pixels and the second step length 304 may be set to be 2 pixels. A module used for detecting the candidate area 303 using the first sliding window may also be referred to as a coarse detector, and a module used for detecting a face area using the second sliding window may also be referred to as a fine detector. The face detection apparatus may include the coarse detector and the fine detector. Here, the coarse detector and the fine detector may be implemented as, for example, hardware modules, software modules, and various combinations thereof. Also, since each of the coarse detector and the fine detector is adopted in an independent form of detector for detecting a face, the face detection apparatus may use one of the coarse detector and the fine detector to detect the face.

The coarse detector may classify first scan images scanned by the first sliding window 302 based on a threshold. In this example, the threshold may be defined in association with whether the face is included. The coarse detector may record a size and coordinates of an area including the face based on scan images classified as images corresponding to the face, and determine the candidate area based on a recorded result.

Referring to FIG. 3, the face detection apparatus may detect the face area from the candidate area through a fine detection. The fine detector of the face detection apparatus may receive the candidate area output from the coarse detector. The fine detector may perform the fine scanning on the candidate area 303 while moving the second sliding window 305 at an interval of the second step length 304 less than the first step length 301. The candidate area 202 detected by the coarse detector may be an area scanned by the fine detector.

The fine detector may classify second scan images scanned using the second sliding window 305 based on a threshold. In this example, the threshold may be defined in association with whether the face is included and also set to have a face detection accuracy higher than that of the threshold used for the coarse detection. In one example, the first sliding window 302 may be the same in size as the second sliding window 305. However, sizes of the first sliding window 302 and the second sliding window 305 are not limited to the example and different sizes may be adopted for the first sliding window 302 and the second sliding window 305 based on a setting condition.

Example of Small Face Detector-based Image Pyramid Scheme

Figure 4:
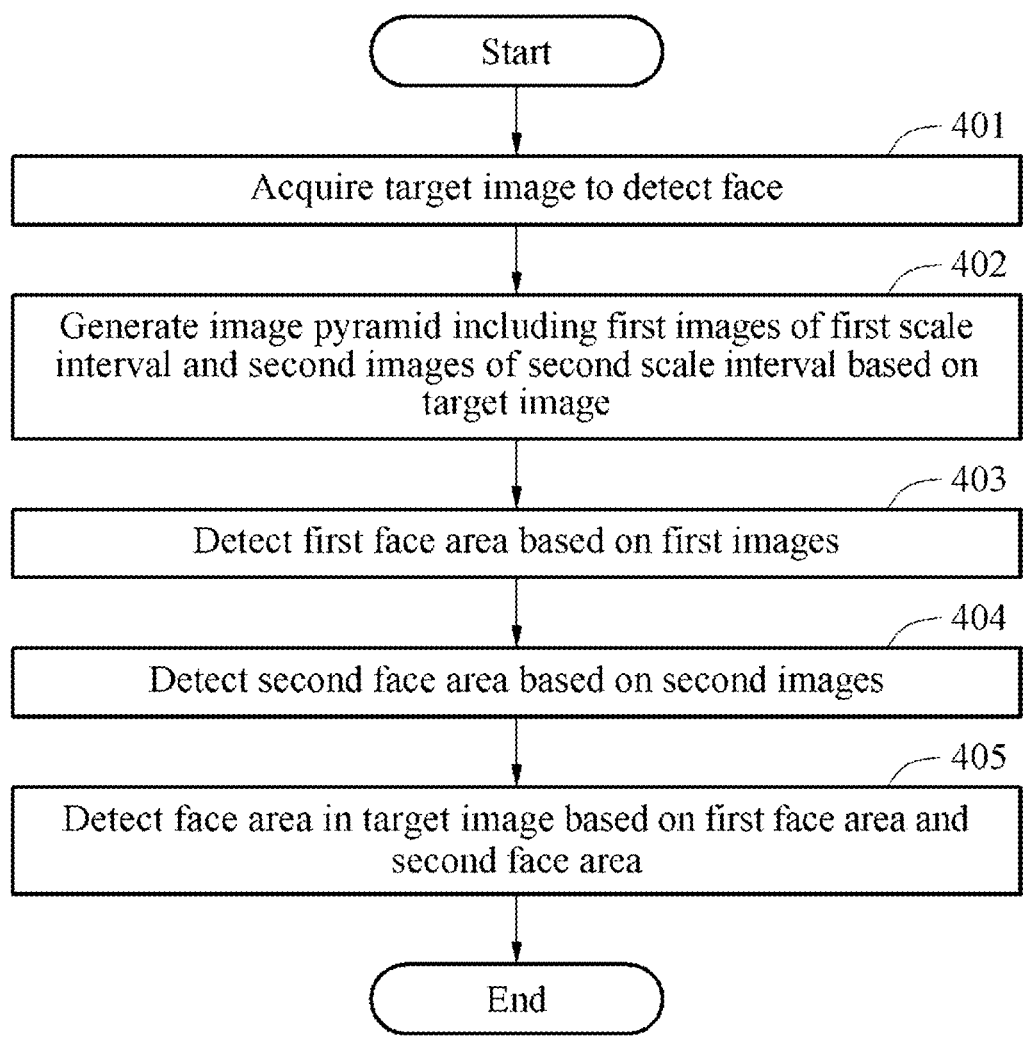
FIG. 4 illustrates another example of a face detection method according to at least one example embodiment.

FIG. 4 illustrates another example of a face detection method according to at least one example embodiment.

Figure 5:
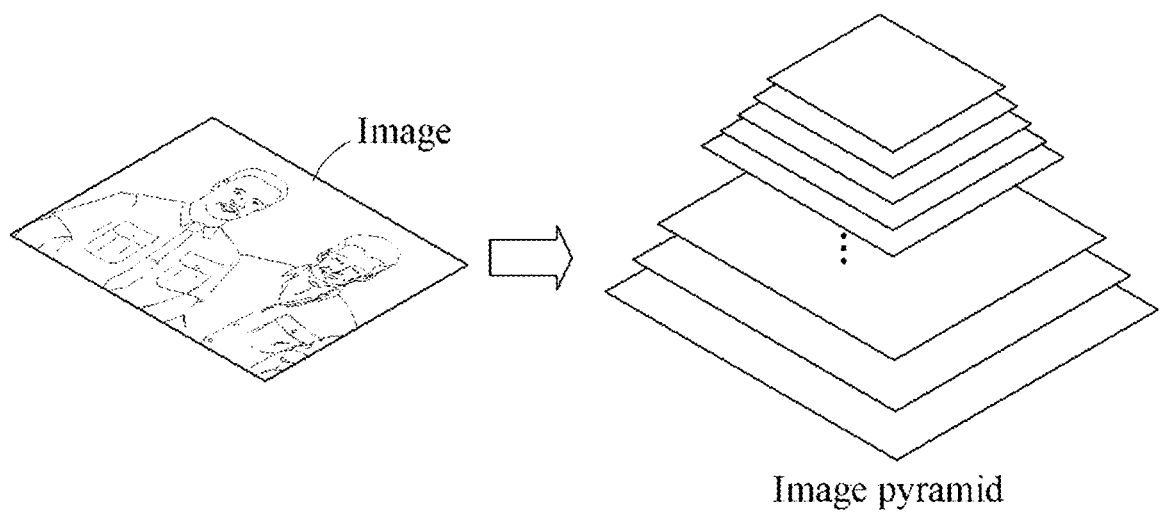
FIG. 5 illustrates an example of an image pyramid-based detection scheme according to at least one example embodiment.

In operation 401, a face detection apparatus may acquire a target image to detect a face. An image pyramid-based method may be used to detect faces corresponding to various sizes and postures. By upscaling or downscaling an image from which the face is to be detected based on a desired or, alternatively, predetermined scale, the face detection apparatus may acquire different sizes of images. Referring to FIG. 5, when the acquired images are arranged in an order from a small image to a large image in a longitudinal direction, an image pyramid in which a lowermost portion includes a largest image and an uppermost portion includes a smallest image may be constructed.

The different sized images included in the image pyramid may include faces of different sizes corresponding to the sizes of the images. A detector may detect a face from an image in any size. For example, the detector may scan images included in the image pyramid using the sliding window described with reference to FIG. 2, and detect the face based on the scanned images. Using the image pyramid-based method, images of each level in the image pyramid may be scanned by a sliding window, and the scanned images may be identified by the same detector. For example, a detector trained to detect a desired or, alternatively, predetermined sized face from a desired or, alternatively, predetermined size of template image may detect the face from an image matching the template image from the scanned image.

For example, a size of the template image and the size of the face in the template image may be a fixed size defined in advance. In response to a request for detecting a relatively small face, the sliding window may scan an image included in a lower portion of the image pyramid based on a size of the template image. In this example, the image included in the lower portion of the image pyramid may be a relatively large image. The detector may detect a small face based on a result of scanning the image in the lower portion. The image in the lower portion or at a low level of the image pyramid may be an image acquired by enlarging an input image or an original input image. Also, a size of the image at the low level may be greater than the size of the template image of the detector. As such, the image at the low level has a relatively large size and thus, a speed of scanning may decrease. Due to restrictions on the size of the template image of the detector, the speed of scanning may decrease in a process of detecting a relatively small face. Also, a detector scanning all sizes of images in the image pyramid may provide a performance that decreases according to increase in the number of scanning times of the sliding window and the number of scanned images.

The face detection apparatus may use a small face detector and a standard face detector to detect a face from images included in the image pyramid. Since the small face detector and the standard face detector perform scanning on images of each scale interval, the face detection apparatus may efficiently scan the images and increase an accuracy on a face detection. The small face detector and the standard face detector included in the face detection apparatus may be implemented as, for example, hardware modules, software modules, or various combinations thereof. Also, the small face detector and the standard face detector may each be adopted as an independent form of detector for detecting a face. Thus, the face detection apparatus may detect the face using one of the small face detector and the standard face detector.

Figure 6:
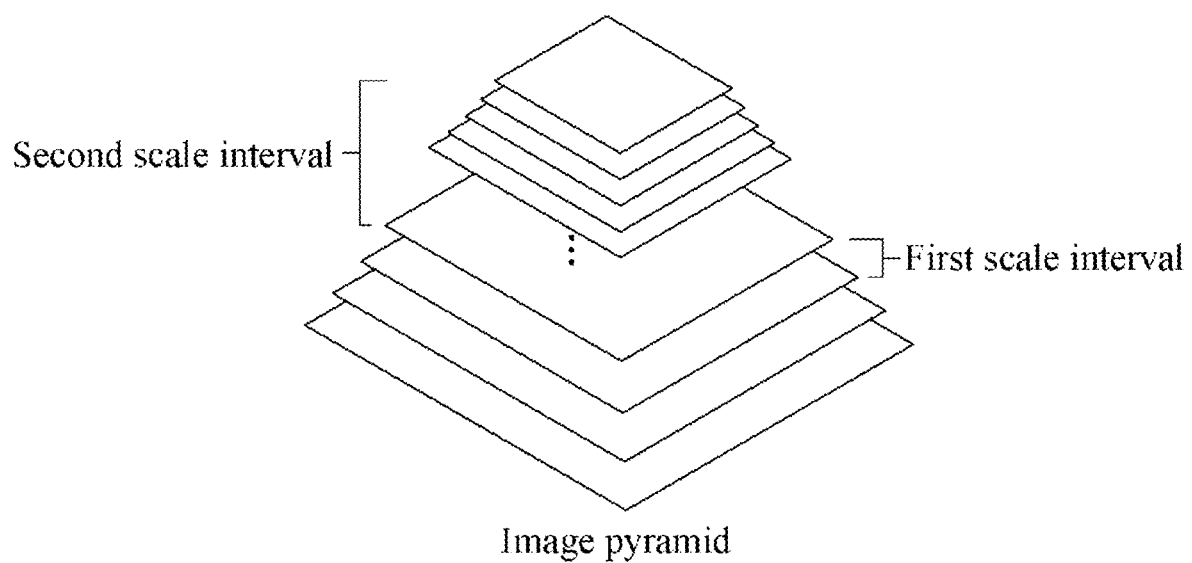
FIG. 6 illustrates an example of a scale interval of an image pyramid according to at least one example embodiment.

In operation 402, the face detection apparatus generates an image pyramid including first images of a first scale interval and second images of a second scale interval based on the target image. Referring to FIG. 6, the first images of the first scale interval may be images scanned by a small face detector, and the second images of the second scale interval may be images scanned by the standard face detector. The small face detector may be trained to detect a first face-sized face from a first image sized-image. The standard face detector may be trained to detect a second face-sized face from a second image-sized image.

For example, a ratio of the first face-sized face to the first image sized-image may be less than a ratio of the second face-sized face to a second image-sized image. The small face detector and the standard face detector may be trained to detect a desired or, alternatively, predetermined sized face from a desired or, alternatively, predetermined size of template image. Referring to FIG. 7, a ratio of a face to a template of the standard face detector may be greater than a ratio of a face to a template image of the small face detector. For example, when compared to the standard face detector, the small face detector may detect the face from an image of which a portion corresponding to a background is relatively large excluding the face.

The face detection apparatus may generate the first images and the second images in a scheme of upscaling or downscaling the target image, and generate the image pyramid including first images of the first scale interval and second image of the second scale interval. An overlapping interval may be present between the first scale interval and the second scale interval. Also, the first scale interval and the second scale interval may be intervals separate from each other. The face detection apparatus may realize the image pyramid by generating first images and second images scanned by the small face detector and the standard face detector, respectively. For example, the face detection apparatus may determine the first scale interval based on a target image size and a first image size corresponding to the small face detector, and a size of a target face to be detected. Also, the face detection apparatus may determine the second scale interval based on a target image size and a second image size corresponding to the standard face detector, and the size of the target face to be detected. The face detection apparatus may generate a plurality of levels of first images included in the first scale interval through a scaling of the target image based on the determined first scale interval, and generate a plurality of levels of second images included in the second scale interval through a scaling of the target image based on the determined second scale interval. In this example, the scaling of the target image may indicate an operation of upscaling or downscaling the target image based on a desired or, alternatively, predetermined scale and may include, for example, an operation of increasing and reducing the number of pixels of the target image based on a desired or, alternatively, predetermined ratio.

When generating the image pyramid, the face detection apparatus may scale the target image in consideration of specifications of the small face detector and the standard face detector. In this example, the face detection apparatus may generate images of levels to be scanned and thus, may efficiently realize the image pyramid. For example, the face detection apparatus may determine a number of levels of the image pyramid and an image size for each level based on the first scale interval and the second scale interval. Using such scheme of generating images of required levels, the face detection apparatus may generate an image pyramid having the number of levels less than that of a general image pyramid.

The face detection apparatus may generate a plurality of sizes of images by scaling the target image based on desired or, alternatively, predefined ratios, and determine the first scale interval and the second scale interval from an image pyramid including the plurality of sizes of images. In this example, the image pyramid may include images of levels not needing to be scanned by the small face detector or the standard face detector.

In operation 403, the face detection apparatus may detect a first face area based on the first images. The small face detector of the face detection apparatus may scan the first images using a sliding window and detect the first face area from the scanned first images. For example, the small face detector may scan the first images using a sliding window corresponding to the first image size. Also, the small face detector may detect the first face area using the coarse-to-fine detection scheme. The small face detector including the coarse detector and the fine detector may detect a candidate area from the first images through a coarse detection and detect the first face area from the candidate area through a fine detection. In this example, a size of the sliding window used by the coarse detector and the fine detector may be set to be the same as the first image size. A size of the sliding window is not limited to the example and thus, various sizes of the sliding window are applicable to the present disclosure.

In operation 404, the face detection apparatus may detect the second face area based on the second images. The standard face detector of the face detection apparatus may scan the second images using a sliding window and detect the second face area from the scanned second images. For example, the standard face detector may scan the second images using a sliding window corresponding to the second image size. Also, the standard face detector may detect the second face area using the coarse-to-fine detection scheme. The descriptions of operation 403 are also applicable to operation 404.

In operation 405, the face detection apparatus may detect a face area in the target image based on the first face area and the second face area. The face detection apparatus may combine the first face area and the second face area and detect the face area from an original target image. For example, the face detection apparatus may calculate a size and a location of a face in the target image based on a scale of an image from which the first face area is detected, a size and coordinates of the first face area in the image from which the first face area is detected, a scale of an image from which the second face area is detected, and a size and coordinates of the second face area in the image from which the second face area is detected. The face detection apparatus may detect the face area from the target image based on the calculated size and location of the face.

In one example, a size of a sample image used for training the small face detector may be less than a size of a sample image used for training the standard face detector. In this example, the standard face detector may employ a detector used in a general scheme for an image pyramid. Due to a size of a sample image used in a process of learning, a size of a template image of the small face detector may be less than a size of a template image of the standard face detector. To detect a small face, the small face detector may detect the face from images corresponding to a relatively high level or a relatively small size in the image pyramid. Through this, it is prevented that images corresponding to a relatively low level or a relatively large size in the image pyramid are scanned due to an employment of the small face detector. The small face detector may be restricted on detecting the face from a scanned image of which a most portion corresponds to the face. Thus, when detecting a relatively large face of the target image, the small face detector may provide a detection rate lower than that of the standard face detector. Thus, to compliment the restrictions of the small face detector, the standard face detector may scan images of the image pyramid and detect the relatively large face. The face detection apparatus may increase a detection speed by reducing the number of scanning times of the sliding window and the number of scan images. Also, the face detection apparatus may employ the small face detector and the standard face detector in a trade-off relationship, thereby ensuring a high level of detection accuracy.

Figure 8:
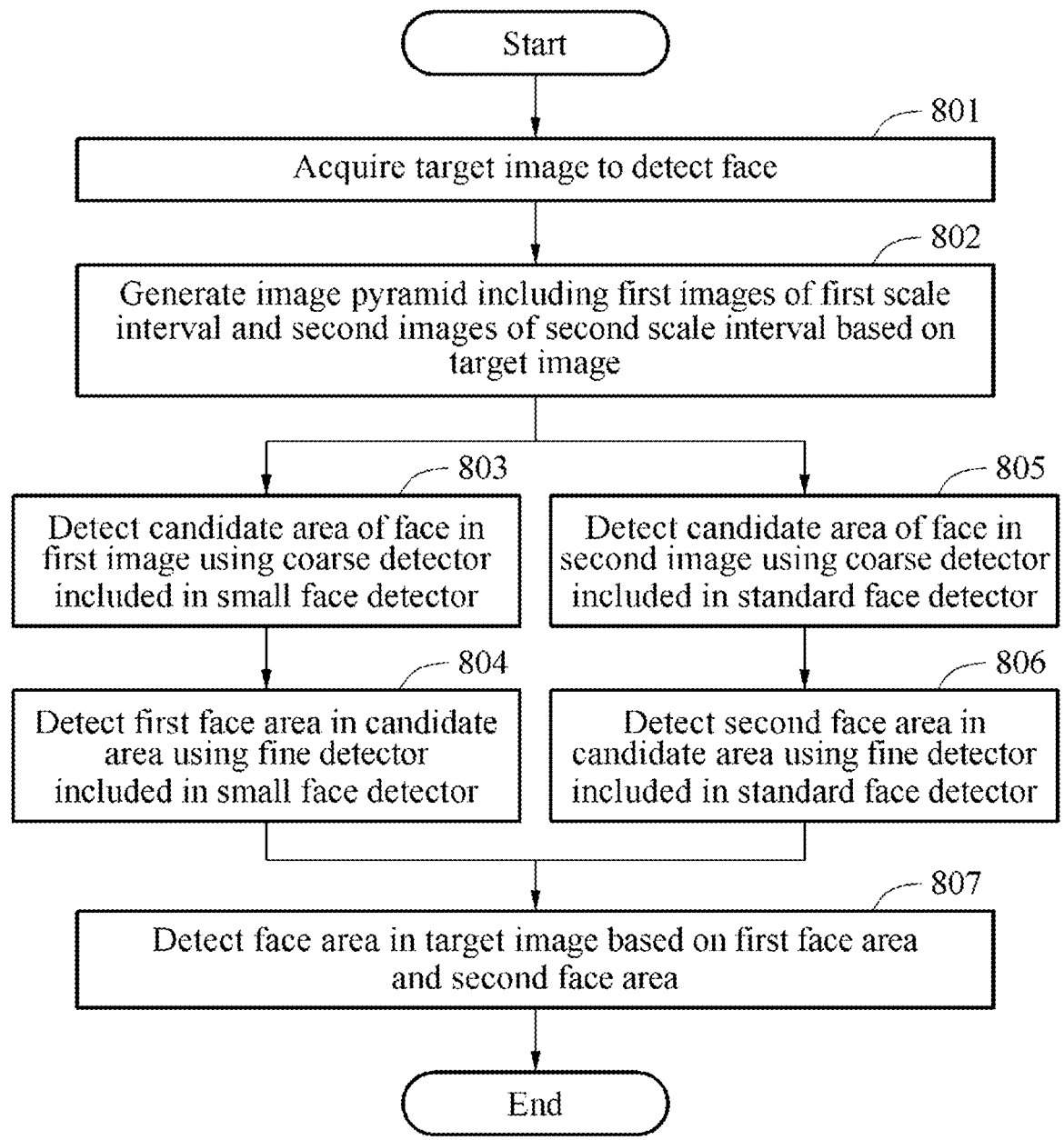
FIG. 8 illustrates still another example of a face detection method according to at least one example embodiment.

Example of Combination of Small Face Detector-based Image Pyramid Scheme and Coarse-to-fine Detection Scheme FIG. 8 illustrates still another example of a face detection method according to at least one example embodiment.

In operation 801, a face detection apparatus acquires a target image to detect a face. A standard face detector and a small face detector included in the face detection apparatus may include the coarse detector and the fine detector, respectively.

In operation 802, the face detection apparatus may generate an image pyramid including first images of a first scale interval and second images of a second scale interval based on the target image. In this example, a small face detector-based image pyramid scheme may be applicable to the image pyramid. For example, when a resolution of the target image is 1024×1024 pixels, a lowermost level, for example, a first level of a general image pyramid may be a target image of 1024×1024 pixels, and a second level, a third level, and a fourth level of the general pyramid may be images having a resolution of 512×512 pixels, a resolution of 256×256 pixels, and a resolution of 128×128 pixels, and the images may be acquired by scaling the target image. In this example, the face detection apparatus may not generate the second level corresponding to the resolution of 512×512 pixels based on at least one of a target face size, for example, a face size of at least 16×16 pixels, a first image size, a second image size, or a target image size. Also, the lowermost level of the general image pyramid may be an image obtained by enlarging the target image. The face detection apparatus may generate an image pyramid of which a lowermost level is the target image based on at least one of the target face size, the first image size, the second image size, or the target image size. An image size of the uppermost level in the image pyramid generated by an image face detector may be the same as a size of a template image of the small face detector or a size of a template image of the standard face detector.

In operation 803, the face detection apparatus may detect a candidate area of the face in the first image using the coarse detector included in the small face detector. The first image may be one of the first images. The coarse detector included in the small face detector may detect the candidate area of the face from the first images of the first scale interval. Here, the descriptions provided with respect to the coarse-to-fine detection scheme are also applicable to the coarse detector. For example, the coarse detector may scan the first images of the first scale interval using a sliding window and detect the candidate area from the scanned first images.

In operation 804, the face detection apparatus may detect a first face area in the candidate area using the fine detector included in the small face detector. The fine detector included in the small face detector may scan the candidate area using the sliding window and detect the face area from the scanned images. Here, the descriptions provided with respect to the coarse-to-fine detection scheme are also applicable to the fine detector. A size of the sliding window used by the coarse detector may be, but not limited to, the same as a size of the sliding window used by the fine detector.

In operation 805, the face detection apparatus may detect a candidate area of the face in a second image using the coarse detector included in the standard face detector. The second image may be one of the second images. The coarse detector included in the standard face detector may detect the candidate area of the face from the second images of the second scale interval. Here, the descriptions provided with respect to the coarse-to-fine detection scheme are also applicable to the coarse detector.

In operation 806, the face detection apparatus may detect a second face area in the candidate area using the fine detector included in the standard face detector. The fine detector included in the standard face detector may scan the candidate area using the sliding window and detect the face area from the scanned images. Here, the descriptions provided with respect to the coarse-to-fine detection scheme are also applicable to the fine detector. A size of the sliding window used by the coarse detector may be, but not limited to, the same as a size of the sliding window used by the fine detector.

In one example, the size of the sliding window used by the coarse detector and the fine detector included in the small face detector, for example, a size of 16×16 pixels may be set to be less than the size of the sliding window used by the coarse detector and the fine detector included in the standard face detector. The small face detector and the standard face detector may have the same size of template image and the same size of sliding window, and also have different sizes of template images and/or different sizes of sliding window based on a design.

In operation 807, the face detection apparatus may detect a face area in the target image based on the first face area and the second face area. The face detection apparatus may combine the first face area detected by the small face detector and the second face area detected by the standard face detector and may calculate a size and a location of the face in the target image. The face detection apparatus may receive a scale of an image including the first face area and a size and coordinates of the first face area from the small face detector. The face detection apparatus may receive a scale of an image including the second face area and a size and coordinates of the second face area from the standard face detector. The face detection apparatus may detect the face area in the target image based on information received from the small face detector and the standard face detector An operation of detecting the first face area using the small face detector and an operation of detecting the second face area using the standard face detector may be performed in parallel, in sequence, or selectively. The face detection apparatus may select one of the first face area and the second face area to detect the face area in the target area. The face detection apparatus may also apply a weight to the first face area and the second area to detect the face area.

The face detection apparatus may remove one of overlapping faces based on the detected face areas. For example, two face areas x and y may be assumed as areas detected by the face detection apparatus. The face detection apparatus may calculate a ratio between an overlapping area between the face areas x and y and an area corresponding to a combination of the face areas x and y. The face detection apparatus may determine whether the face areas x and y overlap each other based on the calculated ratio. When the face areas x and y overlap each other, the face detection apparatus may remove one of the two face areas x and y. When the calculated ratio is greater than a desired or, alternatively, predetermined threshold, for example, 0.3, and when a difference in scale between the face areas x and y is less than or equal to a desired or, alternatively, predetermined threshold, for example, 4, the face detection apparatus may determine that the face areas x and y overlap each other. The face detection apparatus may calculate a width and a height of the overlapping area between the face areas x and y using coordinates of the overlapping area. Also, the face detection apparatus may restore the face area x and remove the face area y in the overlapping area based on an average value of the calculated width and height.

After restoring the face area x, the face detection apparatus may calculate two desired or, alternatively, predetermined face areas. The face detection apparatus may calculate a ratio between an overlapping area between the two face areas and an area corresponding to a combination of the two face areas. When the calculated ratio is greater than a desired or, alternatively, predetermined threshold, for example, 0.4, the face detection apparatus may determine that the two face areas overlap each other and remove a smaller face area between the two face areas. The face detection apparatus may repeat the foregoing operation such that a ratio between an overlapping area between two face areas and an area corresponding to a combination of the two face areas is to be less than or equal to a desired or, alternatively, predetermined threshold, for example, 0.4 with respect to all face areas detected in the target image.

Learning of face detection apparatus

The standard face detector and the small face detector included in the face detection apparatus, the coarse detector and the fine detector included in the standard face detector, and the coarse detector and the fine detector included in the small face detector may be trained to detect a face. In this example, various schemes such as a Viola Jones scheme, a local binary pattern (LBP) scheme, and a multi-scale local binary pattern (MB-LBP) scheme may be applied to the training.

An MB-LBP feature and an AdaBoost algorithm may be employed to train the standard face detector. For example, an operation of training the standard face detector using a sample image of a 24×24-pixel square will be described.

To train the coarse detector included in the standard face detector, a detection condition of the coarse detector may be relatively loose when compared to a detection condition of the fine detector. Here, the relatively loose detection condition of the coarse detector may indicate that the coarse detector is more likely to verify a desired or, alternatively, predetermined image to correspond to a face when the coarse detector and the fine detector detect the face from the image. In terms of meaning, the loose detection condition may be opposite to a strict detection condition. Also, the relatively strict detection condition of the fine detector may indicate that the fine detector is more likely to verify a desired or, alternatively, predetermined image to correspond to a background when the coarse detector and the fine detector detect the face from the image. For example, when detecting a face from an image of which a half portion is a background and another half portion is the face, the coarse detector having the loose detection condition may verify that the image corresponds to the face and the fine detector having the strict detection condition may verify that the image corresponds to the background.

When training the coarse detector and the fine detector using a sample image set including a plurality of sample images, a threshold of a face detection rate of the coarse detector may be set to be less than a threshold of a face detection rate of the fine detector. Also, in a process of training the coarse detector and the fine detector, an iteration count of an operation of identifying a sample image of the coarse detector may be set to be less than an iteration count of the operation of the fine detector.

The coarse detector may determine whether a value acquired based on a desired or, alternatively, predetermined image is included in a desired or, alternatively, predefined range to verify whether the image corresponds to the face. When the value is included in the desired or, alternatively, predefined range, the coarse detector may verify that the image corresponds to the face. Here, the desired or, alternatively, predefined range may indicate a range between a value to which an offset is added based on a threshold for detecting the face and a value from which the offset is subtracted based on the threshold. The desired or, alternatively, predefined range used by the coarse detector to detect the face may be set to be greater than a desired or, alternatively, predefined range used by the fine detector.

As described above, the coarse detector and the fine detector may be trained such that the detection condition of the coarse detector is relatively loose when compared to the detection condition of the fine detector. The coarse detector may have a detection accuracy lower than that of the fine detector, and a candidate area detected by the coarse detector may include the background as well as the face. Also, the fine detector of the standard face detector may be trained such that the detection condition of the fine detector is stricter than the detection condition of the coarse detector. Thus, a face area detected from the candidate area by the fine detector may be an image obtained by removing the background from the candidate area.

To train the small face detector, the MB-LBP feature and the AdaBoost algorithm may be employed and the process of training the standard face detector may also be applied. For example, the small face detector may be trained using a sample image of a 16×16-pixel square. In this example, the coarse detector and the fine detector included in the small face detector may be trained through the foregoing training process. When compared to the coarse detector and the fine detector included in the standard face detector, the coarse detector and the fine detector included in the small face detector may be trained to identify an image in which a portion corresponding to a background surrounding a face is relatively large to be the face.

The aforementioned detectors may be trained based on the AdaBoost algorithm, the MB-LBP feature, Multiple Branch Tree, and a multiple instance pruning (MIP) as described below.

(1) Learning Based on AdaBoost Algorithm

An AdaBoost algorithm may be a type of an iteration algorithm and used to combine weak classifiers to construct one strong classifier. Based on the AdaBoost algorithm, a weak classifier may be selected from all candidate weak classifiers and training may be performed such that an error function of the selected weak classifier is reduced or, alternatively, minimized. When one sample is accurately classified, a weight of the classified sample may decrease in a sample set used to train a subsequent weak classifier. Conversely, when one sample is inaccurately classified, a weight of the one sample may increase in the sample set used to train the subsequent weak classifier. Through this, weights of the sample set may be updated and the sample set including the updated weights may be used to train the subsequent weak classifier. The foregoing operation may be iterated in an overall learning process.

The error function of the weak classifier may be defined according to Equation 1.

$$J_{wse} = \sum_{i=1}^{N} w_i(y_i - f_m(x_i))^2 \quad \text{[Equation 1]}$$

In Equation 1, N denotes the number of samples, $w_i$ demotes a weight of a sample, $y_i$ denotes a tag of the sample, $f_m(x_i)$ is a weak classifier, $x_i$ denotes a feature of the sample, and i denotes an index of the sample. The tag of the sample may be a value indicating whether the sample is a face or a background, and also be referred to as a label. The strong classifier may be defined using Equation 2.

$$F(x) = \sum_{m=1}^{M} f_m(X) \quad \text{[Equation 2]}$$

In Equation 2, m denotes an index of a weak classifier and M denotes the number of classifiers. When the detection rate and accuracy acquired from the sample set reach a threshold A, or when training of all weak classifiers is terminated, training of the strong classifier may be terminated. To perform the training such that the detection condition of the coarse detector is looser than the detection condition of the fine detector, the threshold A of the coarse detector may be set to be less than the threshold A of the fine detector. Also, an iteration count of an operation for training the coarse detector may be set to be less than an iteration count of an operation for training the fine detector.

(2) MB-LBP Feature

Figure 9:
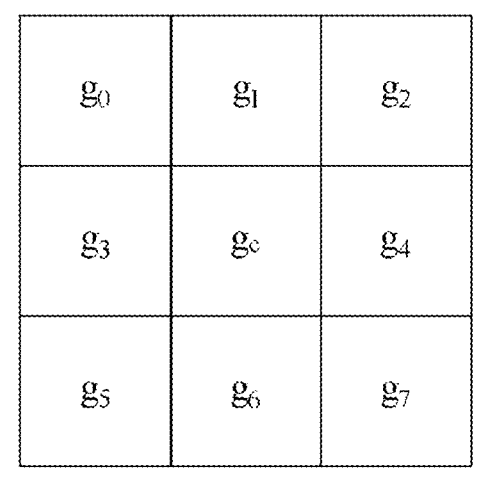

An MB-LBP feature may be input to a weak classifier. Referring to FIG. 9, the MB-LBP feature may be generated based on a 3×3 grid area. In this example, a 3×grid area may be defined based on a desired or, alternatively, predetermined position of an image.

To acquire the MB-LBP feature, the face detection apparatus may calculate an average value of pixels in the grid area, compare an average value of pixels in a central grid area to an average value of pixels in a surrounding grid area, code a comparison result in binary, and generate the MB-LBP feature.

The MB-LBP feature may be a value between 0 and 255. The MB-LBP feature may be expressed by Equation 3.

$$MB - LBP = \sum_{i=0}^{7} \text{sign}(g_i - g_c)^2 \quad \text{[Equation 3]}$$

In Equation 3, sign ($\square$) is a sign function, $g_i$ denotes an average value of pixels in a surrounding grid area, and $g_c$ denotes an average value of pixels in a central grid area.

(3) Weak Classifier

A weak classifier may be defined as a multi-branch tree adopting the MB-LBP feature.

The multi-branch tree may be defined using Equation 4.

$$f_m(x) = \begin{cases} a_0, & x = 0, \\ \ldots \\ a_j, & x = j, \\ \ldots \\ a_{255}, & x = 255. \end{cases} \quad \text{[Equation 4]}$$

In Equation 4, x denotes an MB-LBP feature and $a_j$ denotes a classifier parameter, j being a value between 0 and 255.

The classifier parameter may be obtained using Equation 5.

$$a_j = \frac{\Sigma_i w_i y_i \delta(x_i = j)}{\Sigma_i w_i \delta(x_i = j)} \quad \text{[Equation 5]}$$

In Equation 5, $$\delta(x_i = j) = \begin{cases} 1, & x_i = j \\ -1, & x_i \neq j \end{cases},$$

$w_i$ denotes a weight of an sample i, $x_i$ denotes an MB-LBP feature of the sample i, and $y_i$ denotes a tag of the sample i.

(4) Multiple Instance Pruning (MIP) Scheme and Application

Figure 10:
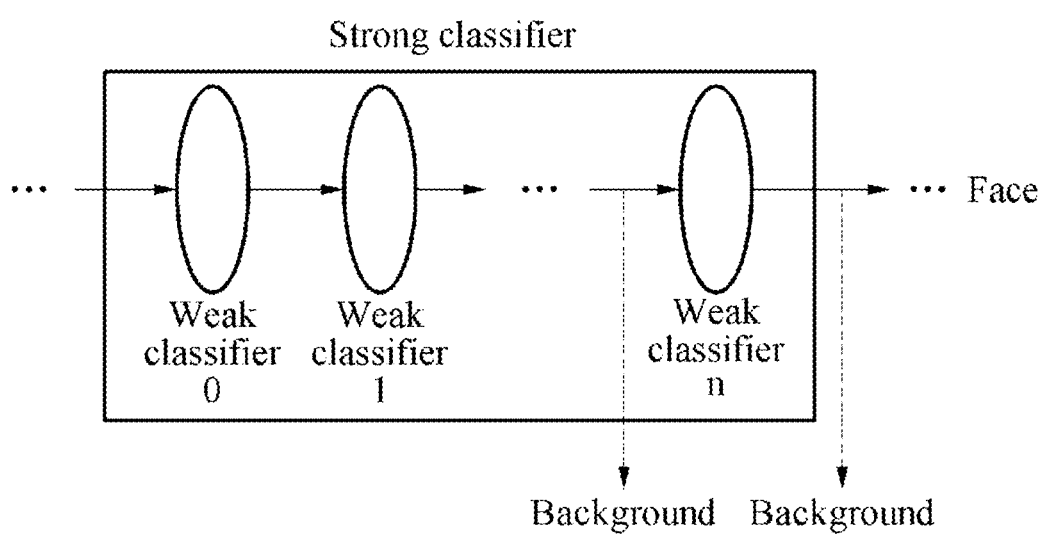
FIG. 10 illustrates an example of a classifier according to at least one example embodiment.

A strong classifier trained based on the AdaBoost algorithm may include weak classifiers. Referring to FIG. 10, the strong classifier may be indicated by a box and the weak classifiers may be indicated by ovals in the box. When the MIP scheme is not applied, an image may pass through all of the weak classifiers and the strong classifier may determine whether the image corresponds to a face or a background based on a predefined threshold. When the MIP scheme is applied, each of the weak classifiers may determine whether the image corresponds to the face or the background based on a threshold defined for each of the weak classifiers. Based on the MIP scheme, one of the weak classifiers may determine that the image corresponds to the background. In this example, the strong classifier may not need to perform determination.

An MIP-based learning operation may be performed through a backward propagation. For example, the MIP-based learning operation may be performed as follows.

(i) After the learning is terminated, the strong classifier may classify all samples, and scores may be recorded when the classified samples pass the weak classifiers.

(ii) When a desired or, alternatively, predetermined sample is classified by the strong classifier, each of the weak classifiers may output a detection frame. The detection frame may correspond to a score obtained from a first weak classifier to a last weak classifier that outputs the detection frame. In the backward propagation, a score F(x) may be obtained based on scores recorded when the detection frame passes the weak classifiers. For example, a score recorded when a desired or, alternatively, predetermined detection frame passes a $P_{th}$ weak classifier may be defined using Equation 6.

$$F_p(x) = \Sigma_{58}^P f_m(x) \qquad [\text{Equation 6}]$$

In Equation 6, m denotes an index of a weak classifier, P denotes an index of a weak classifier that outputs a detection frame, and a definition of □ may vary based on a design.

(iii) With respect to a weak classifier p, a lowest score of scores corresponding to all samples or all training samples may be set to be a threshold of the weak classifier p. Here, the threshold may also be referred to as "Pos-Threshold".

In a process of detection, in response to a score $F_p(x)$ recorded when a desired or, alternatively, predetermined image passes the weak classifier p is less than Pos-Threshold, the corresponding image may be classified as a background. When the score $F_p(x)$ is greater than Pos-Threshold, the weak classifier p may transfer the corresponding image to a subsequent weak classifier.

When the face detection apparatus is trained based on the MIP scheme, and when only samples corresponding to the face, for example, positive samples are adopted, a detection rate may decrease. Although the MIP scheme corresponds to the backward propagation, the threshold of the weak classifier may be more optimized or, alternatively, improved by setting the threshold in consideration of samples corresponding to the background, for example, negative samples as well as the positive samples.

Through the foregoing operation, Pos-Threshold of the weak classifier may be obtained. Hereinafter, an example of acquiring a threshold based on the negative samples will be described.

(i) After the learning is terminated, the strong classifier may classify negative samples, and scores may be recorded when the classified negative samples pass the weak classifiers.

(ii) With respect to a weak classifier p, a lowest score of scores corresponding to the negative samples may be set to be a threshold of the weak classifier p. Here, the threshold may also be referred to as "Neg-Threshold".

(iii) The threshold of the weak classifier P, for example, threshold=Pos-Threshold×$\lambda_2$+Neg-Threshold×$\lambda_2$ may be obtained by merging Pos-Threshold and Neg-Threshold using a desired or, alternatively, predetermined weight, $\lambda_1$ and $\lambda_2$ and being weights and $\lambda_2+\lambda_2=1$. The weights may be determined experientially. For example, a threshold may be obtained by setting a weight as the following equation:

threshold=Pos-Threshold×0.8=Neg-Threshold×0.2

Based on the foregoing learning process, the face detection apparatus may be trained as follows. The strong classifier may include a plurality of weak classifiers and the strong classifier may be trained based on the MIP scheme. For example, to obtain a threshold corresponding to the strong classifier or the weak classifiers, the MIP scheme adopting the positive samples and the negative samples may be applied.

Based on the foregoing learning process, the small face detector, the standard face detector, the coarse detector, and the fine detector may be trained. An operation of detecting a face using the trained coarse detector and fine detector will be described as below.

Figure 11:
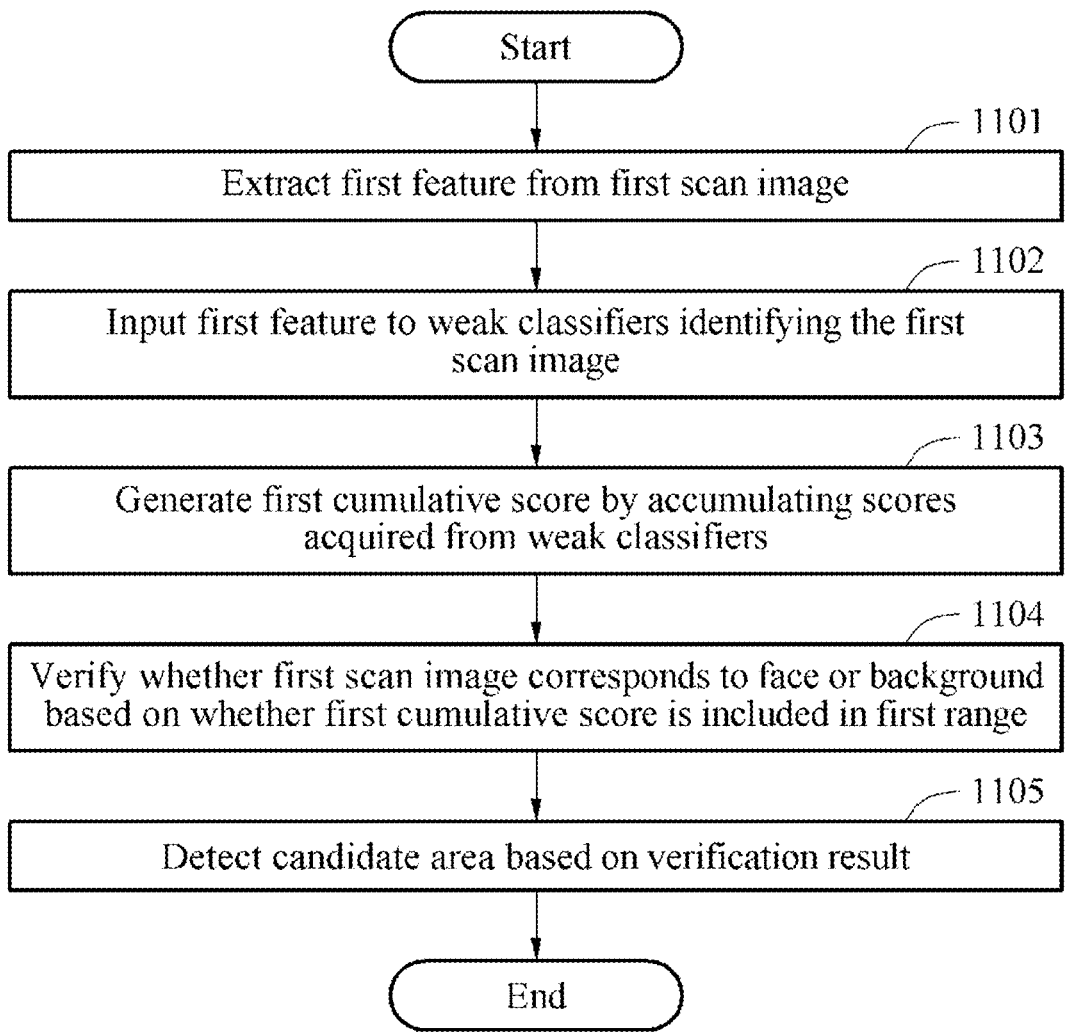
FIG. 11 illustrates an example of an operation of a coarse detector according to at least one example embodiment.

FIG. 11 illustrates an example of an operation of a coarse detector according to at least one example embodiment.

In operation 1101, a coarse detector may extract a first feature from a first scan image. The first scan image may be an image scanned from a target image using a first sliding window. The first feature may be an MB-LBP feature.

In operation 1102, the coarse detector may input the first feature to weak classifiers, each configured to identify the first scan image. In operation 1103, the coarse detector may generate a first cumulative score by accumulating scores acquired from the weak classifiers. The weak classifier may generate a score based on the input MB-LBP feature and verify whether the first scan image corresponds to a face based on the generated score. In response to a verification that the first scan image corresponds to the face, the weak classifier may input the MB-LBP feature to a subsequent weak classifier.

In operation 1104, the coarse detector may verify whether the first scan image corresponds to the face or a background based on whether the first cumulative score is included in a first range. The first range may be generated based on a first threshold and a second threshold. The first threshold and the second threshold may be Neg-Threshold and Pos-Threshold, respectively. When a score greater than or equal to the first threshold is generated, the weak classifier may determine that the first scan image corresponds to the face. When a score less than the second threshold is generated, the weak classifier may determine that the first scan image corresponds to the background. In operation 1105, the coarse detector may detect a candidate area based on a verification result. Since the foregoing explanation is also applicable here, repeated descriptions of an operation of detecting a face using the coarse detector will be omitted.

Figure 12:
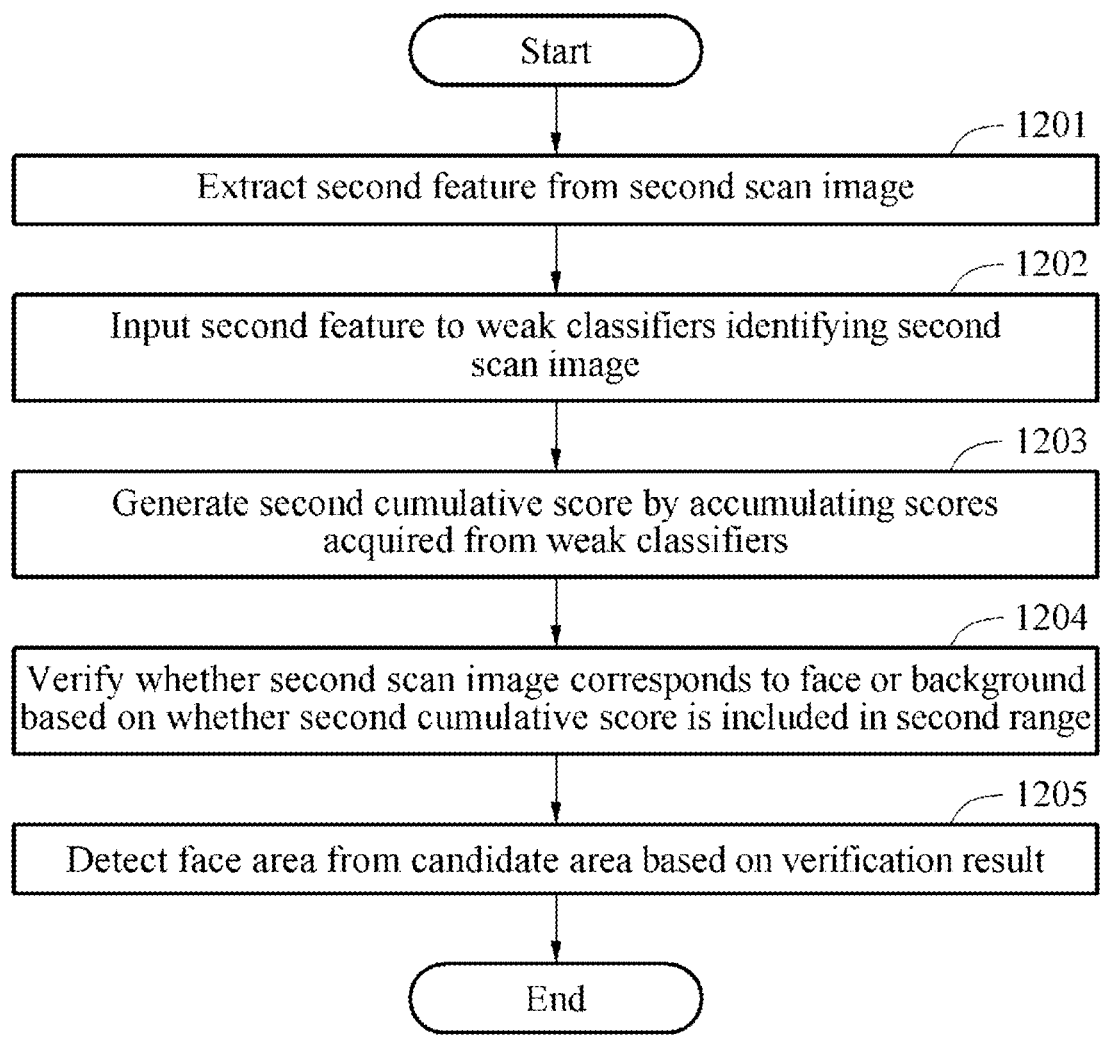
FIG. 12 illustrates an example of an operation of a fine detector according to at least one example embodiment.

FIG. 12 illustrates an example of an operation of a fine detector according to at least one example embodiment.

In operation 1201, a fine detector may extract a second feature from a second scan image. The second scan image may be an image scanned using a second sliding window based on a candidate area detected by a coarse detector. The second feature may be an MB-LBP feature.

In operation 1202, the fine detector may input the second feature to weak classifiers, each configured to identify the second scan image. In operation 1203, the fine detector may generate a second cumulative score by accumulating scores acquired from the weak classifiers. In operation 1204, the fine detector verifies whether the second scan image corresponds to a face or a background based on whether the second cumulative score is included in a second range. In operation 1205, the fine detector may detect a face area from a candidate area based on a verification result. The first range may be set to be greater than the second range and thus, a detection condition of the coarse detector may be flexibly set when compared to a detection condition of the fine condition.

An Example of Face Detection Using Different Channels

Figure 13:
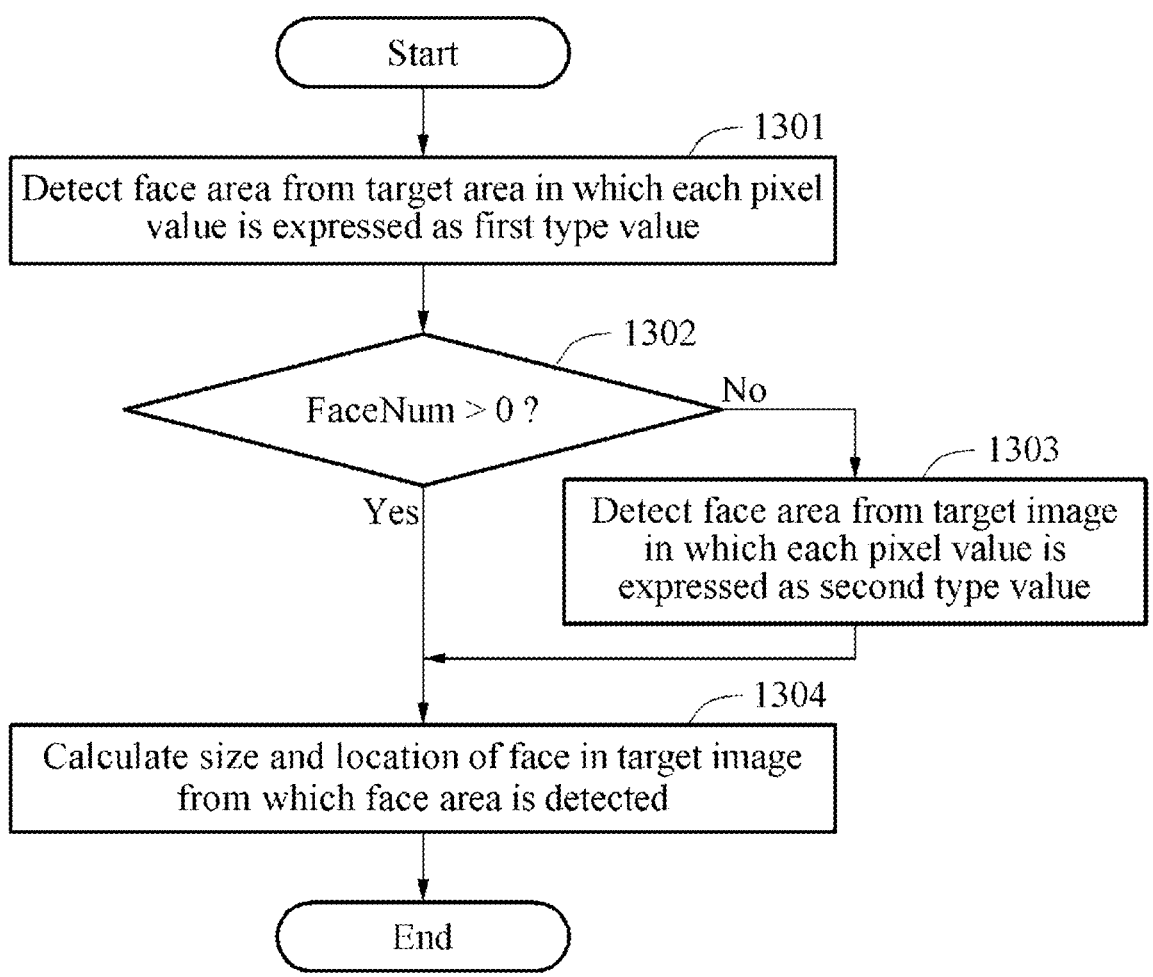
FIG. 13 illustrates yet another example of a face detection method according to at least one example embodiment.

FIG. 13 illustrates yet another example of a face detection method according to at least one example embodiment.

In operation 1301, a face detection apparatus may detect a face area from a target area in which each pixel value is expressed as a first type value. In this example, a value of each pixel in the target image may be expressed as a value of a first type. The first type may include all types of expressing a value of a pixel. The first type may be a criterion of defining an axis of a color space such as red, green, blue, a luma, and a chrominance, for example, $C_B$ and $C_R$, and other various types may be applicable thereto.

In one example, the face detection apparatus may generate a target image in which a pixel value is expressed as a value of Y by preprocessing a target image in which the pixel value is expressed as an RGB value. Here, Y denotes the luma. The face detection apparatus may detect the face area from the preprocessed target image. In this example, a channel for detecting the face area from the target image in which the pixel value is expressed as the value of Y may also be referred to as a channel Y. The face detection apparatus may detect the face area through the channel Y.

In operation 1302, the face detection apparatus may determine whether the number of face areas detected from the target image is greater than zero. When the number of detected face areas is zero, the face detection apparatus may determine that a detection of the face area fails. When the first type is Y, the face detection apparatus may determine that a detection of the face area through the channel Y fails.

In operation 1303, when failing to detect the face area from the target image, the face detection apparatus may detect the face area from a target image in which each pixel value is expressed as a second type value. Here, a second type may differ from the first type.

For example, the second type may be R. Here, R denotes the red. The face detection apparatus may process the target image and generate a target image in which a pixel value is expressed as a value of R. The face detection apparatus may detect the face area from the preprocessed target image. A channel for detecting the face area from the target image in which the pixel value is expressed as the value of R may also be referred to as a channel R. In response to failing to detect the face area through the channel Y, the face detection apparatus may detect the face area through the channel R. When detecting the face area through the channel Y, it is vulnerable to detect a face from an image captured under a backlight condition or detect a dark complexion face from an image. In this example, using the channel R, face detection may be normally performed. Thus, the face detection apparatus may detect the face area through the channel Y under a normal condition, and detect the face area through the channel R in response to failing to detect the face area through the channel Y.

In operation 1304, the face detection apparatus may calculate a size and a location of the face in the target image from which the face area is detected.

Figure 14:
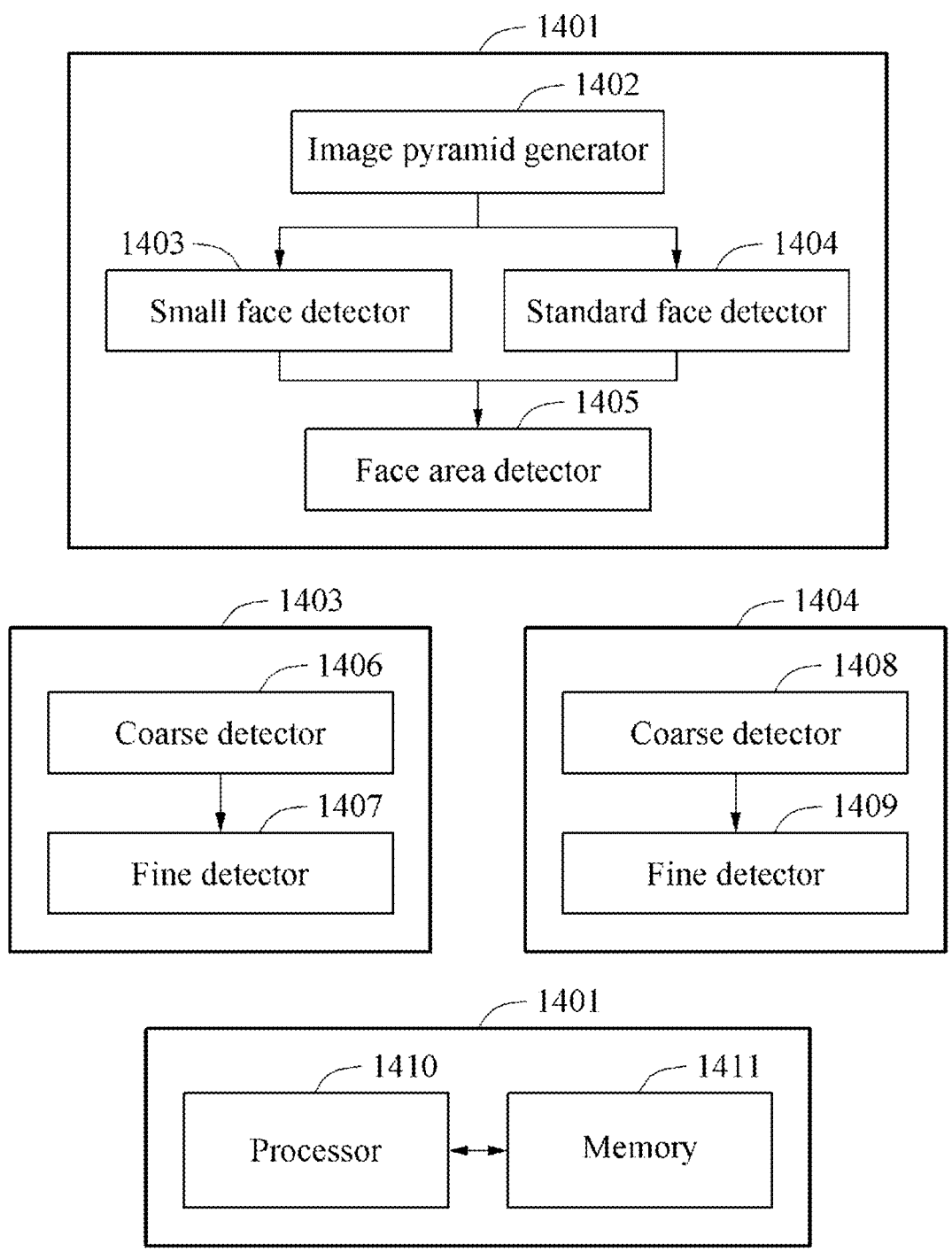
FIG. 14 illustrates an example of a face detection apparatus according to at least one example embodiment.

FIG. 14 illustrates an example of a face detection apparatus according to at least one example embodiment.

Referring to FIG. 14, a face detection apparatus 1401 may include an image pyramid generator 1402, a small face detector 1403, a standard face detector 1404, and a face area detector 1405. The small face detector 1403 may include a coarse detector 1406 and a fine detector 1407. The standard face detector 1404 may include a coarse detector 1408 and a fine detector 1409.

The image pyramid generator 1402 may acquire a target image to detect a face and generate an image pyramid including first images of a first scale interval and second images of a second scale interval based on the target image. Since the foregoing explanation is also applicable here, repeated description will be omitted.

The small face detector 1403 may detect a first face area based on first images, and repeated description will be omitted since the foregoing explanation is also applicable here.

The standard face detector 1404 may detect a second face area based on second images, and repeated description will be omitted since the foregoing explanation is also applicable here.

The face area detector 1405 may detect a face area in the target area based on the first face area and the second face area, and repeated description will be omitted since the foregoing explanation is also applicable here.

Since the foregoing explanation is also applicable to operations of the coarse detector 1406, the fine detector 1407, the coarse detector 1408, and the fine detector 1409, repeated descriptions will be omitted for brevity.

In one example, the face detection apparatus 1401 includes a processor 1410 and a memory 1411. The processor 1410 may execute the aforementioned commands, and the memory 1420 may record required information for the foregoing examples.

According to at least some example embodiments, the face detection apparatus 1401 may include, or be implemented by, the processor 1410 executing computer-readable code (e.g., software and/or firmware) that is stored in the memory 1420 and includes instructions for causing the processor 1410 to carry out and/or control some or all of the operations described in the present disclosure as being performed by a face detection apparatus (and/or an element thereof). The processor 1410 may be, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

Figure 15:
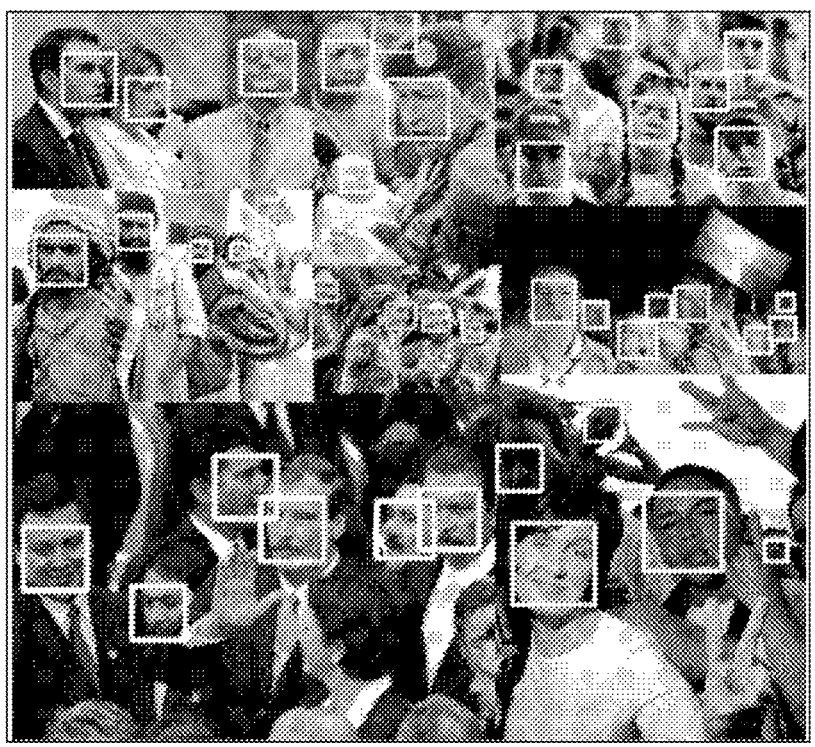
FIG. 15 illustrates an example of a detected face area according to at least one example embodiment.

FIG. 15 illustrates an example of a detected face area according to at least one example embodiment.

Referring to FIG. 15, a face detection apparatus may detect a face area from images including a face in various sizes and various postures.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. According to at least some example embodiments, The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of detecting a face, the method comprising:
acquiring a target image to detect a face;
scanning the target image using a first sliding window moving at an interval of a first step length;
detecting a candidate area of the face in the target image based on first scan images scanned using the first sliding window;
scanning the candidate area using a second sliding window moving at an interval of a second step length that is less than the first step length; and
detecting a face area in the candidate area based on second scan images scanned using the second sliding window,
wherein the detecting of the candidate area includes,
extracting a first feature from a first image, the first image being one of the first scan images;
inputting the first feature to weak classifiers each configured to identify the first image;
generating a first cumulative score by accumulating scores acquired from the weak classifiers that are configured to identify the first image;
verifying whether the first image corresponds to the face or a background based on whether the first cumulative score is included in a first range; and
detecting the candidate area based on a verification result,
wherein the first range is generated based on a first threshold and a second threshold, and
wherein the weak classifiers are each configured to,
determine that the first image corresponds to the face when a score greater than or equal to the first threshold is generated; and
determine that the first image corresponds to the background when a score less than the second threshold is generated.

2. The method of claim 1, wherein the detecting of the face area comprises:
extracting a second feature from a second image, the second image being one of the second scan images;
inputting the second feature to weak classifiers each configured to identify the second image;
generating a second cumulative score by accumulating scores acquired from the weak classifiers that are configured to identify the second image;
verifying whether the second image corresponds to the face or the background based on whether the second cumulative score is included in a second range; and
detecting the face area based on a verification result,
the first range greater than the second range.

3. The method of claim 1 wherein,
the first feature is a multi-scale block local binary pattern (MB-LBP) feature, and
the weak classifiers are each configured to,
generate an intermediate score based on the MB-LBP feature;
verify whether the first image corresponds to the face based on the generated intermediate score; and input the MB-LBP feature to a subsequent weak classifier when the first image is the face.

4. The method of claim 1, further comprising:
detecting the face area from the target image a value of each pixel of which is expressed as a value of a second type in response to a failure to detect the face area from the target image the value of each pixel of which is expressed as a value of a first type.

5. The method of claim 4, wherein at least one of the first type or the second type includes at least one of a luma or red.

6. A method of detecting a face, the method comprising:
acquiring a target image to detect the face;
generating an image pyramid including first images of a first scale interval and second images of a second scale interval based on the target image;
detecting a first face area based on the first images using a first face detector trained to perform face detection with respect to a first size;
detecting a second face area based on the second images using a second face detector trained to perform face detection with respect to a second size; and
detecting a third face area in the target image based on the first face area and the second face area.

7. The method of claim 6, wherein,
the first face detector is a small face detector configured to detect a face of the first size from an image of a third size, and
the second face detector is a standard face detector configured to detect a face of a the second size from an image of a fourth size.

8. The method of claim 7, wherein a ratio of the first size to the third size is less than a ratio of the second size to the fourth size.

9. The method of claim 7, further comprising:
determining the first scale interval based on a size of a target face to be detected, a size of a first image, and a size of the target image; and
determining the second scale interval based on the size of the target face, a size of a second image, and the size of the target image.

10. The method of claim 6, wherein the detecting of the first face area comprises:
scanning at least one of the first images using a first sliding window moving at an interval of a first step length to generate first scan images;
detecting a candidate area of the face in the scanned at least one first image based on the first scan images;
scanning the candidate area using a second sliding window moving at an interval of a second step length less than the first step length to generate second scan images;
detecting a face area of the candidate area based on the second scan images; and
detecting the first face area based on the detected face area of the candidate area.

11. The method of claim 6, wherein the detecting of the third face area includes calculating a size and a location of the face in the target image based on a scale of an image from which the first face area is detected, coordinates of the first face area, a scale of an image from which the second face area is detected, and coordinates of the second face area.

12. The method of claim 6, further comprising:
determining whether the detected third face area includes two face areas; and
when the third face area is determined to include two face areas, determining whether the two face areas overlap each other based on a ratio between an overlapping area between the two face areas and an area corresponding to a combination of the two face areas; and
removing one of the two face areas in the overlapping area.

13. The method of claim 6, further comprising:
detecting the third face area from the target image a value of each pixel of which is expressed as a value of a second type in response to a failure to detect the third face area from the target image the value of each pixel of which is expressed as a value of a first type,
wherein at least one of the first type or the second type includes at least one of a luma or red.

14. A non-transitory computer-readable medium comprising computer readable instructions to cause a computer to perform the method of claim 1.

15. An apparatus for detecting a face, the apparatus comprising:
memory storing computer-executable instructions; and
one or more processors configured to execute the computer-executable instructions such that the one or more processors are configured to,
acquire a target image to detect the face and generate an image pyramid including first images of a first scale interval and second images of a second scale interval based on the target image,
detect a first face area based on the first images using a first face detector trained to perform face detection with respect to a first size,
detect a second face area based on the second images using a second face detector trained to perform face detection with respect to a second size, and
detect a third face area in the target image based on the first face area and the second face area.

16. The apparatus of claim 15, wherein the one or more processors are configured to execute the computer-executable instructions such that the one or more processors are configured to,
detect the first face area by using the first face detector to detect a face of the first size from an image of a third size, and
detect the second face area by using the second face detector to detect a face of the second size from an image of a fourth size,
such that a ratio of the first size face to the third size is less than a ratio of the second size to the fourth size.

17. The apparatus of claim 16, wherein the one or more processors are configured to execute the computer-executable instructions such that the one or more processors are configured to,
scan at least one of the first images using a first sliding window moving at an interval of a first step length to generate first scan images,
detect a candidate area of a face in the first image based on the first scan images scanned using the first sliding window,
scan the candidate area using a second sliding window moving at an interval of a second step length less than the first step length to generate second scan images, and
detect a face area of the candidate area based on the second scan images scanned using the second sliding window.

18. The apparatus of claim 17, wherein the one or more processors are configured to execute the computer-executable instructions such that the one or more processors are configured to, implement a strong classifier that includes weak classifiers such that the strong classifier is configured to,
extract a first feature from at least one of the first scan images,
input the first feature into the weak classifiers,
generate a first cumulative score by accumulating scores acquired from the weak classifiers,
verify whether the at least one first scan image corresponds to the face or a background based on whether the first cumulative score is included in a first range, and
detect the candidate area based on a verification result.

* * * * *